(12) United States Patent
Yamamoto et al.

(10) Patent No.: US 6,566,863 B2
(45) Date of Patent: May 20, 2003

(54) ANGLE DETECTOR

(75) Inventors: Seijiro Yamamoto, Kofu (JP); Yuuji Furuta, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/953,864

(22) Filed: Sep. 18, 2001

(65) Prior Publication Data

US 2002/0036502 A1 Mar. 28, 2002

(30) Foreign Application Priority Data

Sep. 28, 2000  (JP) ........................................ 2000-297699

(51) Int. Cl.[7] ................................................. G01B 7/30
(52) U.S. Cl. ............................ 324/207.16; 324/207.22; 324/207.25
(58) Field of Search ..................... 324/207.16, 207.25, 324/207.24, 207.18, 207.22; 340/689, 870.32; 33/1 N

(56) References Cited

U.S. PATENT DOCUMENTS

| | | | | |
|---|---|---|---|---|
| 4,442,348 A | * | 4/1984 | Snyder | 250/203.4 |
| 4,914,291 A | * | 4/1990 | Kan et al. | 250/227.29 |
| 5,107,211 A | * | 4/1992 | Rose | 324/207.16 |
| 5,130,649 A | * | 7/1992 | Kumagai | 324/174 |
| 5,392,654 A | * | 2/1995 | Boyle | 73/761 |
| 5,455,508 A | * | 10/1995 | Takahashi | 324/207.18 |
| 5,660,471 A | * | 8/1997 | Yoshiike et al. | 374/124 |
| 6,034,624 A | * | 3/2000 | Goto et al. | 340/870.32 |

FOREIGN PATENT DOCUMENTS

| | | | | |
|---|---|---|---|---|
| DE | 3212149 A | * 10/1983 | | G01B/7/30 |
| FR | 2 480 428 | 10/1981 | | |
| JP | 10-170210 | * 6/1998 | | G01B/7/00 |
| JP | 2001-082914 | * 3/2001 | | G01B/7/30 |

* cited by examiner

Primary Examiner—Edward Lefkowitz
Assistant Examiner—Darrell Kinder
(74) Attorney, Agent, or Firm—Oblon, Spivak, McClelland, Maier & Neustadt, P.C.

(57) ABSTRACT

A position detector comprising a sensor head and rod is formed to have an arc-like configuration along a rotation locus of a rotating body and an amount of movement of the sensor head along the rod is converted to an angle by dividing the movement amount by a curvature radius common between the rod and the sensor head. By doing so, the rotation angle of the rotating body is calculated.

6 Claims, 3 Drawing Sheets

ANGLE DETECTOR

CROSS-REFERENCE TO RELATED APPLICATIONS

This application is based upon and claims the benefit of priority from the prior Japanese Patent Application No. 2000-297699, filed Sep. 28, 2000, the entire contents of which are incorporated herein by reference.

BACKGROUND OF THE INVENTION

1. Field of the Invention

The present invention relates to an angle detector used for a structure having a rotating body rotated about a shaft, such as a gimbal mechanism, and detecting a rotation angle of the rotating body.

2. Description of the Related Art

An angle detector is used to detect the angle of rotation of a rotating body about a rotating shaft. A rotary encoder is a typical example of this kind of device.

The rotary encoder has a circular disk mounted with its center aligned with the rotating shaft and a light source and light receiving element arranged in a mutually opposite relation with the disk sandwiched therebetween. The disk has slits radiating from its center. Light reaching the light receiving element from the light source is such that, with the rotation of the rotating body, it either passes through the slits or is blocked by the disk. By counting the number of times the light passes through the slits and the number of times the light is blocked by the disk, the rotation angle of the rotating body about the rotation shaft is detected.

By the way, the performance of this kind of device, such as the resolution and accuracy, generally depends upon its size. In the rotary encoder, for example, the greater the size of the disk, the finer the slits, and hence the resolution is enhanced. In a modern precision machine, however, the installation space of the angle detector often has to be made narrower due to the dimensional restriction and the dimension of the angle detector has to be made smaller and it is difficult to obtain a required performance.

In one application of the angle detector, there are cases where, in a two-axis gimbal mechanism, the rotation angles about its axes have to be detected. The gimbal mechanism is mounted, for example, at a nose of a missile and used to support an optical sensor aimed at a target. Inside the missile, it is very difficult to secure its installation space. For the angle detector in such an application it becomes more and more difficult to secure a required performance.

Such a conventional angle detector depends for its performance upon its own dimension. In the case where the installation space is restricted, there is an inconvenience that required performance cannot be achieved.

BRIEF SUMMARY OF THE INVENTION

It is accordingly the object of the present invention to provide an angle detector which can alleviate its dimensional restriction and, by doing so, achieve improved performance.

The present invention is directed to an angle detector for detecting an angle of rotation of a rotating body about a rotation shaft. The angle detector according to the present invention includes a sensor head mounted on the rotating body and having induction coils to which an AC signal is applied and a rod arranged opposite to a moving focus of the sensor head moved with the rotation of the rotating body and having a plurality of magnetically responding members arranged and fixed, wherein the rotation angle of the rotating body is detected from output signals induced in the induction coils by moving the sensor head relative to the rod.

The amount of relative movement between the sensor head and the rod is found by detecting, for example, a phase variation of the induced output signals. The sensor head and rod have the same curvature radius and the movement amount is converted to the rotation angle of the rotating body through the division of the movement amount by the curvature radius.

In the above-mentioned structure, the rotation angle of the rotating body corresponds to the amount of movement of the sensor head along the rod (or the amount of movement of the rod along the sensor head) The amount of movement of the sensor head along the rod is detected by output signals induced in the induction coils.

The sensor head or rod can be provided in such a state as to be buried, for example, into the rotating body itself and support mechanism, etc., supporting the rotating body. Therefore, it is possible to increase the size of the angle detector itself. That is, it is possible to alleviate the dimensional restriction of the angle detector and hence to promote improved performance of the angle detector.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The embodiments of the invention will be described in more detail below with reference to the accompanying drawing.

FIRST EMBODIMENT

Figure 1:
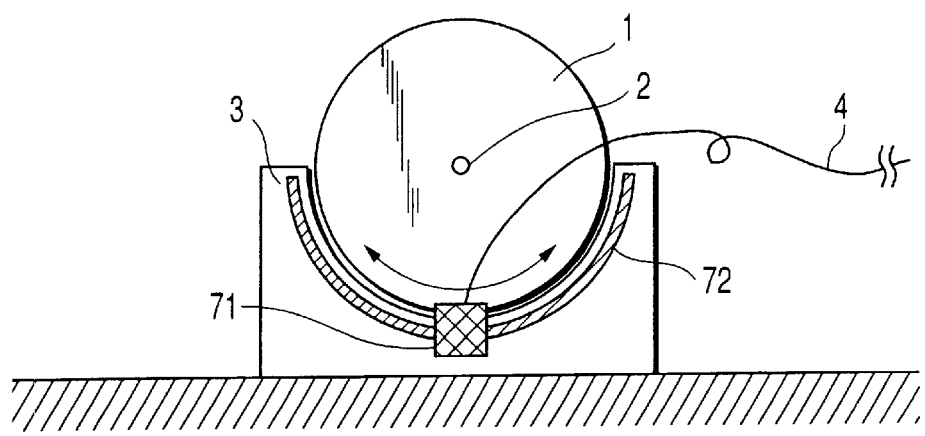
FIG. 1 is a view showing a structure of an angle detector according to a first embodiment of the present invention.

FIG. 1 is a view showing a structure of an angle detector according to a first embodiment of the present invention. The angle detector shown in FIG. 1 includes a sensor head 71 and rod 72. The sensor head 71 is mounted to a rotating body 1 adapted to be rotated about a rotating shaft 2. The rod 72 is mounted on a fixing member 3 provided in a separating relation from the rotating body 1.

With the rotation of the rotating body 1, the sensor head 71 is moved along the rod 72. A connection line 4 is attached to the sensor head 71 and adapted to supply a drive voltage to the sensor head 71 and take out a detection signal corresponding to a rotation signal.

One feature of the above-mentioned structure lies in that the rod 72 is formed to have an arc-like configuration along the moving locus of the sensor head 71. It is preferable that the sensor head 71 and rod 72 have the same curvature radius.

Figure 2A:
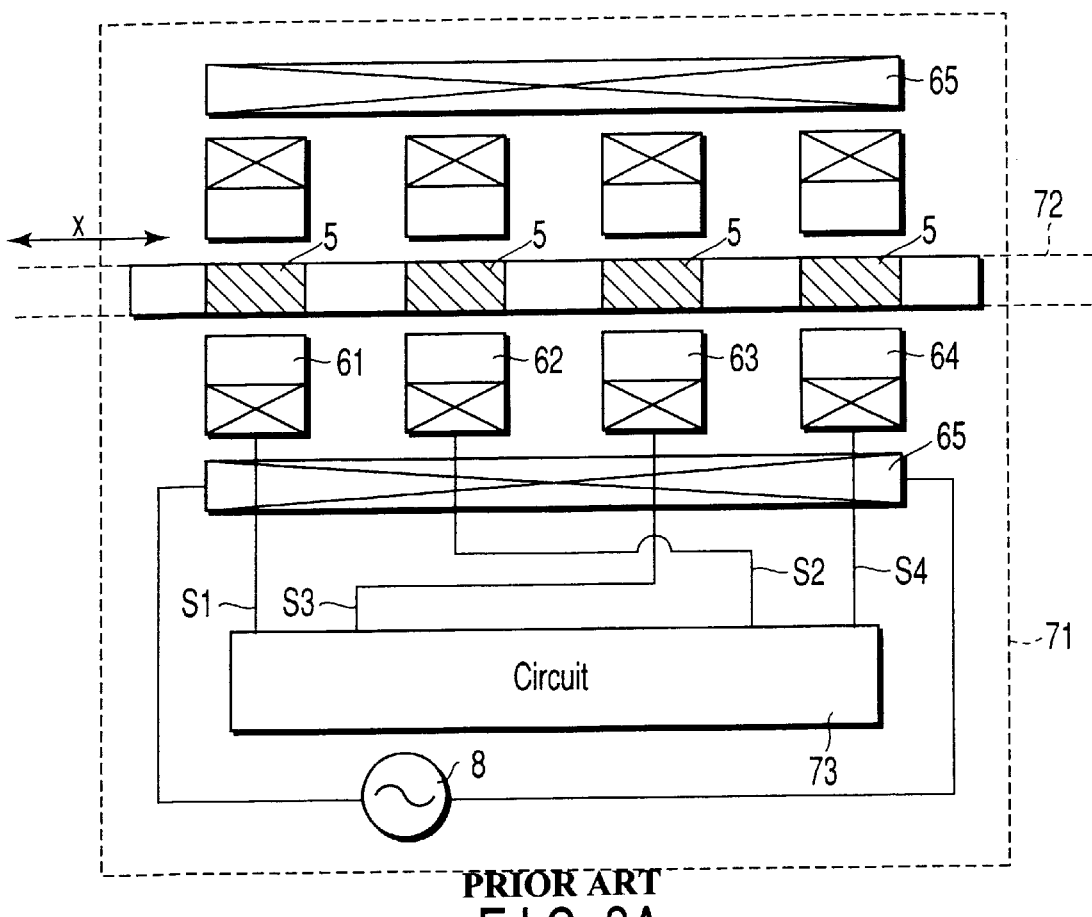
FIGS. 2A and 2B are views for generally explaining the principle of a straight line-like position detector.
Figure 2B:
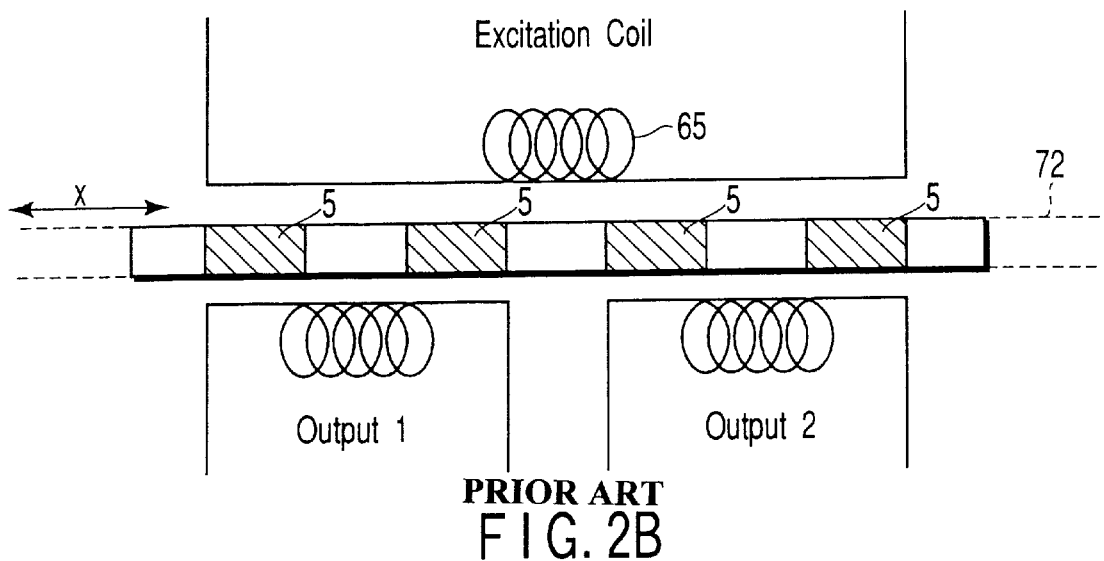

FIG. 2 is a view for generally explaining the principle of a straight line type position detector. In FIG. 2(A) and FIG. 2(B), the same reference numerals are employed to designate portions or areas corresponding to those shown in FIG. 1. The straight line type position detector shown in FIG. 2(A) and FIG. 2(B) are disclosed, for example, in JPN PAT APPLN KOKAI PUBLICATION NO. 10-170210.

In FIG. 2(A), a rod 72 is arranged in a non-contracting state relative to a sensor head 71. The rod 72 has a regular array of magnetically responding member 5.

The sensor head 71 includes an excitation coil 65, induction coils 61–64 and a circuit 73. The induction coils 61–64 are inside of the field from the excitation coil 65. The induction coils 61 and 63 are connected to each other. The induction coils 62 and 64 are connected to each other.

If the excitation coil 65 is excited by an AC excitation signal of a predetermined frequency (generated at an oscillator 8) and the sensor head 71 is moved relative to the rod 72, an AC magnetic flux is inducted to each coil position and two induction output signal are outputted from two pairs of induction coils (61 and 63, 62 and 64).

In FIG. 2(B), if an AC excitation signal (A Sin $\omega$t) is impressed to the excitation coil 65, two signals A Sin ($\theta$, x)·Sin $\omega$t, A Cos ($\theta$, x)·Sin $\theta$t different in amplitude from the AC excitation signal are outputted according to the position of induction coils. In the circuit 73, an output signal A Sin ($\theta$,x)·Sin $\omega$t is shifted $\pi/2$ to A Sin ($\theta$, x)·Cos $\omega$t and a composition signal A Sin ($\omega$t±$\theta$, x) composed A Sin ($\theta$, x)·Cos $\omega$t and another output signal A Cos ($\theta$, x)·Sin $\omega$ t by addition theorem.

The circuit 73 includes a counter that START/RESET are repeated every one cycle synchronized with the excitation signal based on standard clock in the circuit 73. Zero cross points of composition signal A Sin ($\omega$t±$\theta$, x) are outputted and digital values of the counter at zero cross points correspond with ($\theta$, x). Therefore, a position data in rod 72 is obtained by counting a phase difference digitally.

In the angle-detector shown in FIG. 1, the rod 72 is formed in an arc-like configuration. Thus, the amount of relative movement between the rod 72 and the sensor 71 corresponds to a relative rotation angle between the rotating body 1 and the fixing member 3. That is, the amount of relative movement between the rod 72 and the sensor head 71 has a dimension of length. By dividing this relative movement amount by the curvature radius of the rod 72 (or the curvature radius of the sensor head 71) it is possible to calculate the rotation angle of the rotating body.

In the present embodiment thus arranged, the position detector equipped with the sensor head 71 and rod 72 is so formed as to have an arc-like configuration along the rotation locus of the rotating body. By being divided by the curvature radius common between the rod 72 and the sensor head 71, the amount of movement of the sensor head 71 along the rod 72 is converted to a corresponding angle and, by doing so, it is possible to calculate the rotation angle of the rotating body 1.

Since, in this way, the configuration of the angle detector is changed from a disk-like one to the arc-like one, it can be mounted on an associated structure with more effective space utilization. As a result, it is possible to increase the size of the angle detector itself and, hence, to improve the performance of the angle detector.

Figure 3:
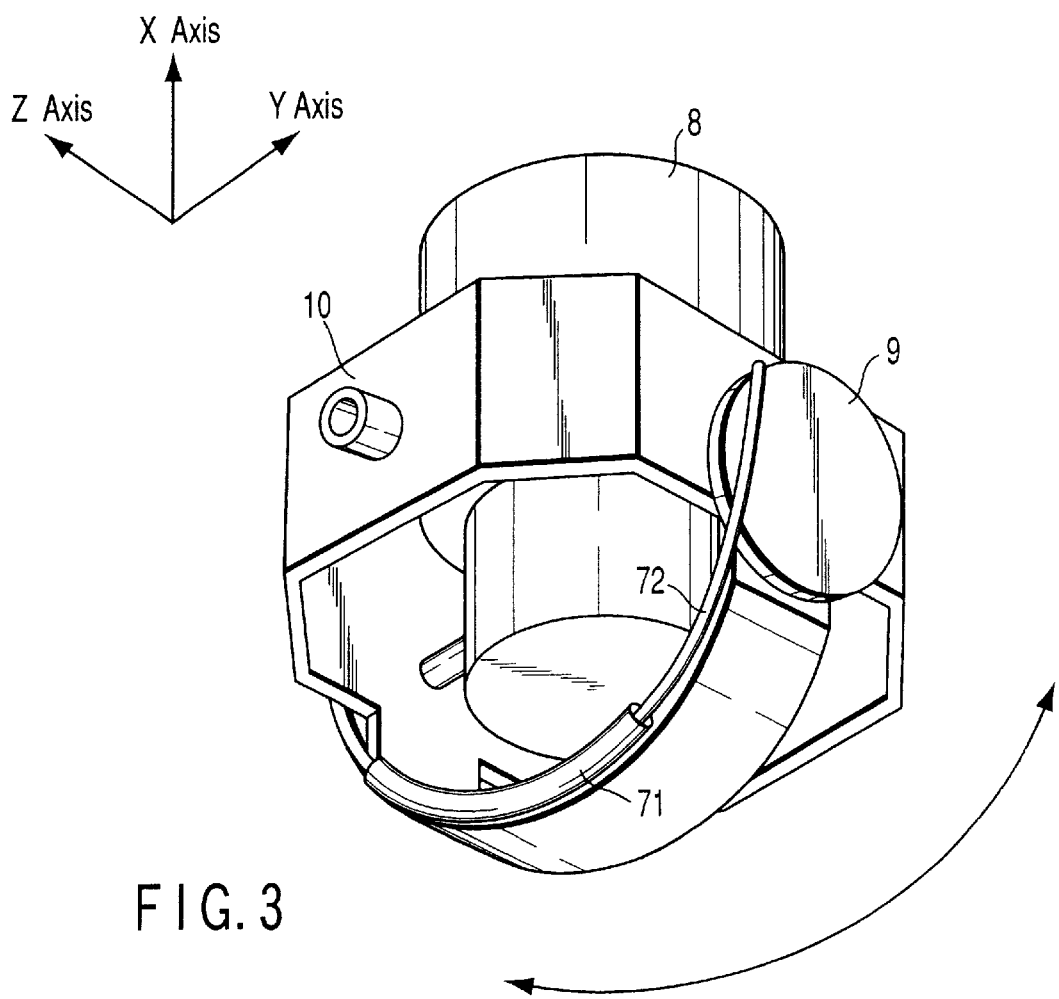
FIG. 3 is a perspective view of a gimbal mechanism having the angle detector shown in FIG. 1.

FIG. 3 is a perspective view showing a gimbal mechanism equipped with the angle detector shown in FIG. 1. The gimbal mechanism includes a gimbal 10 rotatable about a Z axis. A to-be-mounted body 8 is mounted to the gimbal 10 such that it is rotatable about a Y axis. By doing so, the to-be-supported body 8 is rotatable about the Y and Z axes.

The sensor head 71 is mounted on the gimbal 10 at a specified position. The rod 72 is supported by support columns (not shown) and formed in the arc-like configuration to follow a locus of movement of the sensor head about the Z axis. By doing so, it is possible to detect the rotation angle of the gimbal about the Z axis. It is to be noted that the angle of rotation of the to-be-supported body 8 about the Y axis is detected by the existing disk-like angle detect 9.

In comparison with the existing angle detector 9 in FIG. 3, it is possible to increase the operation radius of the angle detector according to the present invention and, hence, to improve the accuracy of the detection angle about the z axis.

SECOND EMBODIMENT

Figure 4:
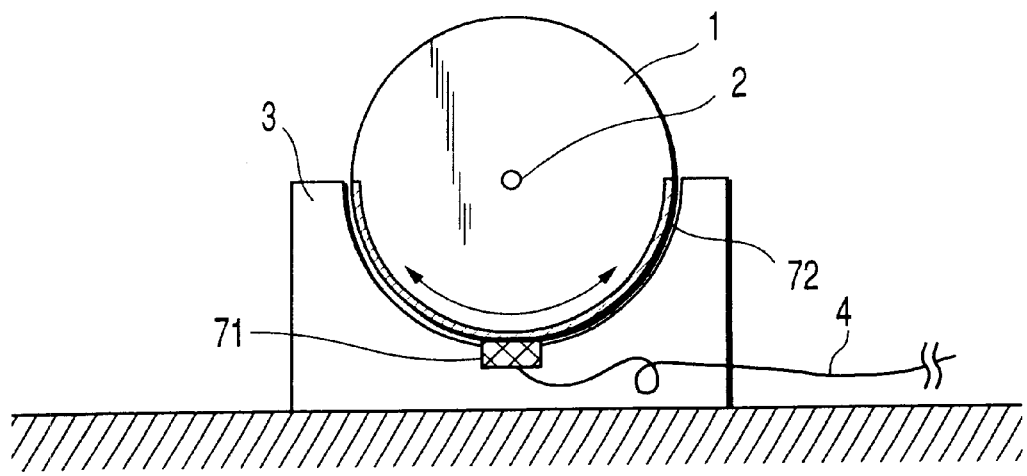
FIG. 4 is a view showing a structure of an angle detector according to a second embodiment of the present invention.

FIG. 4 is a view showing an angle detector according to the second embodiment of the present invention. In FIG. 4, a rod 72 is mounted on one side of a rotating body 1. A sensor head 71 is mounted to a fixing member 3. The rod 72 has its length set to be able to cover the operation range of the rotating body 1 and is preferably mounted on the edge of the rotating body 1.

When, in the above-mentioned arrangement, the rotating body 1 is rotated, the rod 72 is moved. Since the sensor head 71 is fixed, a relative movement between the sensor head 71 and the rod is made with the rotation of the rotating body 1. By doing so, it is possible to detect the rotation angle of the rotating body 1.

According to the above-mentioned embodiment, it is possible to obtain not only the advantages of the first embodiment but also further advantages set out below. In FIG. 4, the sensor head 71 is mounted on the fixing member 3 and, for this reason, there is no risk that a connection line 4 will provide a bar to the rotation of the rotating body 1. Since this ensures a smooth movement of the rotating body 1 and it is also possible to impart no stress to the rotation shaft 2, it is possible to enhance mechanical reliability.

THIRD EMBODIMENT

Figure 5:
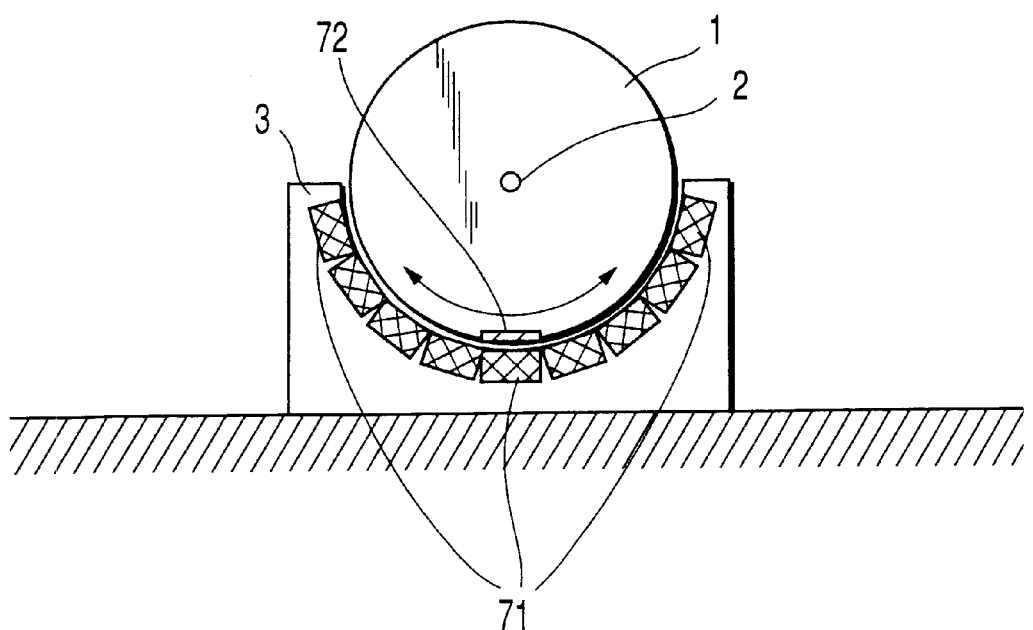
FIG. 5 is a view showing an angle detector according to a third embodiment of the present invention.

FIG. 5 is a view showing a structure of an angle detector according to a third embodiment of the present invention. The angle detector shown in FIG. 5 is of such a type that the length of a rod 72 mounted on a rotating body 1 is made to correspond to one pitch, that is, a length substantially corresponding to a width of a sensor head 71. In this case, a plurality of sensor heads 71 are mounted on a fixing member 3. The operation range of the rotating body 1 is covered by the plurality of sensor heads.

In the above-mentioned structure, the sensor head 71 generates an output, when the rod 72 is moved to face it, that is, the output of the sensor head 71 is made selectively effective and used for the detection of the rotation angle of the rotating body. Further, the measuring range of the angle detection is secured over a plurality of pitches.

In the structure shown in FIG. 4, a necessary angle measuring range is obtained by making the rod 72 longer, while, in the structure shown in FIG. 5, such a necessary angle measuring range is obtained by making the length of the rod 72 smaller and, instead, providing a plurality of sensor heads 71.

Even so, it is possible to obtain the same effect as in FIG. 4. Further, it is also possible to obtain the further advantage set out below. In the structure shown in FIG. 4, the inertial moment of the rotating body 1 is increased due to the weight of the rod 72 and there is a risk that smooth rotation of the rotating body 1 cannot be obtained. In the structure shown in FIG. 5, the inertial moment of the rotating body 1 is made as small as possible and this ensures a smoother rotation of the rotating body 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An angle detector for detecting an angle of rotation of a rotating body about a rotation shaft, comprising:
   a sensor head mounted to the rotating body and having induction coils to which an AC signal is applied;
   a rod having a plurality of magnetically responding members arranged and fixed opposite to a moving locus of the sensor head moved with the rotation of the rotating body, wherein the rotation angle of the rotating body is detected from output signals induced in the induction coils by moving the sensor head relative to the rod.

2. An angle detector according to claim 1, wherein the sensor head and rod have the same curvature radius and an amount of relative movement between the sensor head and the rod is found from the induced output signals and the movement amount is converted to the rotation angle through the division of this movement amount by the curvature radius.

3. An angle detector for detecting an angle of rotation of a rotating body, comprising:
   a rod mounted on the rotating body and having a plurality of magnetically responding members arranged; and
   a sensor head having induction coils to which an AC signal is applied and arranged and fixed opposite to a moving locus of the rod moved with the rotation of the rotating body, wherein the rotation angle of the rotating body is detected from output signals induced in the induction coils by moving the rod relative to the sensor head.

4. An angle detector according to claim 3, wherein the sensor head and rod have the same curvature radius and an amount of relative movement between the sensor head and the rod is found from the induced output signals and the movement amount is converted to the rotation angle through the division of the movement amount by the curvature radius.

5. An angle detector for detecting an angle of rotation of a rotating body about a rotation shaft, comprising:
   a rod mounted on the rotating body and having at least one magnetically responding member; and
   a plurality of sensor heads having induction coils to which an AC signal is applied and arranged and fixed opposite to a moving locus of the rod moved with the rotation of the rotating body, wherein the rotation angle of the rotating body is detected from output signals induced in the induction coil of the sensor heads by moving the rod relative to the sensor heads.

6. Angle detector according to claim 5, wherein the sensor head and rod have the same curvature radius and an amount of relative movement between the sensor head and the rod is found from the induced output signals and the movement amount is converted to the rotation angle through the division of this movement amount by the curvature radius.

* * * * *